United States Patent [19]
Mohri et al.

[11] 3,748,926
[45] July 31, 1973

[54] LINE PRESSURE CONTROL SYSTEM FOR AUTOMATIC POWER TRANSMISSION

[75] Inventors: Yohichi Mohri, Yokohama; Masayuki Ishizaki, Hitachi, both of Japan

[73] Assignees: Nissan Motor Company, Limited, Yokohama-City; Hitachi Limited, Tokyo, Japan

[22] Filed: Dec. 16, 1970

[21] Appl. No.: 98,797

[30] Foreign Application Priority Data
Dec. 22, 1969 Japan.............................. 44/102490

[52] U.S. Cl.................... 74/645, 74/752 A, 74/731, 74/866
[51] Int. Cl. ..... F16h 47/00, F16h 3/74, F16h 47/00
[58] Field of Search.................. 74/645, 752 A, 866, 74/731

[56] References Cited
UNITED STATES PATENTS

| | | | |
|---|---|---|---|
| 3,453,908 | 7/1969 | Iijima | 74/867 |
| 3,513,727 | 5/1970 | Shimosaki | 74/868 |
| 3,640,151 | 2/1972 | Sumiyoshi et al. | 74/731 |
| 3,641,844 | 2/1972 | Wakamatsu et al. | 74/752 |
| 3,088,337 | 5/1963 | Bemmann et al. | 74/752 A |
| 3,354,744 | 11/1967 | Kuhnle et al. | 74/645 |
| 3,420,328 | 1/1969 | Johnson et al. | 74/731 X |
| 3,439,564 | 4/1969 | Scholl et al. | 74/866 |

*Primary Examiner*—Arthur T. McKeon
*Attorney*—McCarthy, Depaoli and O'Brien

[57] ABSTRACT

A line pressure control system for an automatic power transmission capable of maintaining a line pressure at proper levels in response to the engine output torque and the torque convertor turbine speed during gear shift operation. When gear shifting is to be effected, a gear shift indicating signal is applied to a command which allows a signal corresponding to the proper line pressure to be applied to a line pressure regulating means. During a time interval starting at the occurrence of the gear shift operation, the proper line pressure depending upon the output torque and turbine speed is applied to the transmission and upon termination of the time interval a higher line pressure is applied thereto.

3 Claims, 12 Drawing Figures

LINE PRESSURE CONTROL SYSTEM FOR AUTOMATIC POWER TRANSMISSION

This invention relates to an automatic power transmission of a motor vehicle and more particularly to a line pressure control system which is capable of maintaining at proper levels a line pressure of a hydraulic control circuit of the power transmission in accordance with the engine output torque and the torque converter turbine speed during gear shifting.

A driveline of a motor vehicle usually comprises a prime mover, clutch and brake elements, transmission gear train, and traction wheels, so as to cope with the load conditions that vary with the output of the prime mover in a limited range. The motor vehicle having such drive-line commonly requires a driver effort to control the output of the prime mover and the operations of the clutch and brake elements and transmission gear train. Difficulties are sometimes experienced in operating the clutch elements in a manner to effect a smooth starting of the vehicle and a smooth gear shifting between various speeds.

An automatic power transmission is now widely used in various motor vehicles with a view to eliminating these difficulties. A typical automatic power transmission is made up of a torque converter and a gear train, in which the friction clutches and brakes are used for controlling the relative motions of the individual working elements of the gear train to establish forward drive and reverse drive power flows from the prime mover to the driven member of the transmission. The automatic power transmission is usually operated under the control of a hydraulic pressure (which will be referred to as "line pressure") to have the friction clutches and brakes actuated selectively. The friction clutches and brakes are actuated by energizing a series of mutually cooperating solenoid valves through which the line pressure is carried over to the friction clutches and brakes. It is, in this instance, important to have the line pressure regulated properly in accordance with the varying driving conditions of the motor vehicle because an excess line pressure results in unusual mechanical shocks in various parts of the transmission in the course of gear shifting and, on contrary, an insufficient line pressure invites a slippage of brake bands which, in turn, leads to inability of attaining a desired gear ratio and which tends to cause the brake bands to wear earlier. A conventional automatic power transmission has solved this problem by controlling the line pressure in accordance with the speed of the turbine of the torque converter. In the transmission of this known type, the line pressure is kept at a high level when the turbine speed is below a predetermined level and at a low level when the turbine speed is above the predetermined level. Alternatively, the line pressure is decreased in proportion to an increase in the turbine speed. It is however desirable that the line pressure be controlled in accordance with both the turbine speed and the prime mover output torque. Furthermore, if the line pressure is kept at a low level corresponding to the turbine speed, the brake bands tend to wear earlier.

It is, therefore, an object of this invention to provide a line pressure control system for an automatic power transmission, which is adapted to at all times provide a line pressure proper to operate the friction clutches and brakes associated with a planetary gear train.

It is another object of this invention to provide a line pressure control system which is capable of that controlling the transmission fluid circuit line pressure in accordance with both of the turbine speed and the output torque during gear shift operation.

Figure 1:
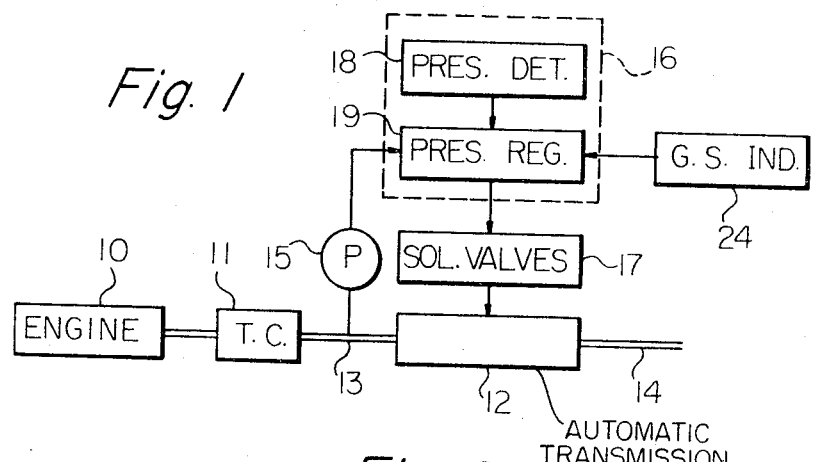
FIG. 1 is a block diagram showing an automotive vehicle driveline and a line pressure control system according to this invention.

Referring to FIG. 1, a preferred embodiment of the system implementing this invention is shown in a block form. As shown, a vehicle engine 10 is connected drivably to an impeller (not identified) of a torque converter 11, the turbine of which is connected drivably to an automotive automatic transmission 12 through a shaft 13. The vehicle engine may be of the type which is disclosed in the U.S. Pat. No. 3,430,616 entitled "Fuel Injection Control System". The output power of the automatic transmission 12 is carried to an output shaft 14 as usual. The automotive automatic transmission may be of the type disclosed in the U.S. Pat. No. 3,604,288 entitled "Electronic Control System for Automotive Automatic Transmission". The torque converter is, for example, clearly described in the above U.S. Patent and, therefore, the detail discussion of the same is herein omitted for the sake of simplicity of description.

Figure 2:
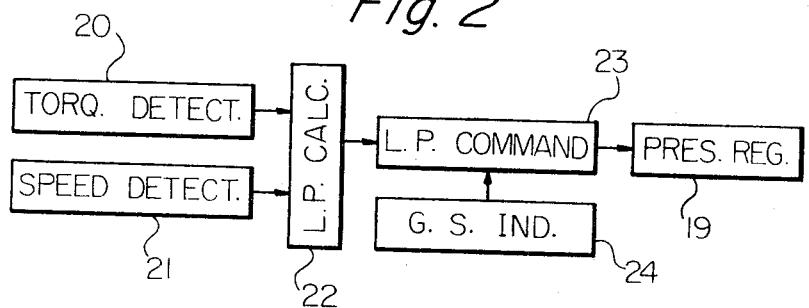
FIG. 2 is a block diagram of the line pressure control system shown in FIG. 1.

A pump 15 is drivably connected to the turbine shaft to produce a line pressure to oPerate friction clutches and brakes (not shown) which are adapted to control the automatic transmission 12. The line pressure generated by the pump 15 is supplied to the friction clutches and brakes through a line pressure control system 16 and a series of solenoid valves 17. The friction clutches and brakes are shown and described in the U.S. Patent mentioned above and, therefore, the detail discussion of the same is herein omitted. The line pressure control system largely comprises a proper line pressure determining means 18 and a line pressure regulating means 19. As shown in FIG. 2, in the proper line pressure determining means 18, the output torque and the turbine speed are detected and converted into electric signals by an engine output torque detecting means 20 and a turbine speed detecting means 21, respectively. The engine output torque detecting means may be of the type which is disclosed in U.S. Pat. No. 3,448,640 entitled "Electrical Control for Automatic Transmission" or U.S. Pat. No. 3,439,564 entitled "Transmission Gear Changing Control Arrangement, Particularly for Motor Vehicles" and, therefore, the detail description of same is herein omitted. The electric signals thus representing the engine output torque and the turbine speed are passed to a proper line pressure calculating means 22. The output torque detecting means 20 may be of the type capable of generating an electric signal proportional to an output torque through detection of the vacuum in the intake manifold of the engine with use of a diaphragm device as disclosed in the above U.S. Patent.

The information thus indicative of the engine output torque is then supplied to a variable resistor or a differential transformer to produce an electric signal representing the output torque. The turbine speed detecting means 21 may be a generator connected to the output shaft of the torque converter turbine, or otherwise the turbine speed may be approximated by the vehicle speed. For example, the turbine speed detecting means may be of the type which is disclosed in the U.S. Pat. No. 3,420,328.00. The proper line pressure calculating means 22 functions to compute a proper line pressure on the basis of the output torque and the turbine speed. A signal indicative of the proper line pressure obtained by the line pressure calculating means 22 is supplied to a line pressure command means 23. The line pressure command means 23 also receives a signal from a gear shift indicating means 24 which is adapted to apply a trigger to the line pressure command means 23 when gear shifting takes place in the transmission. When the line pressure command means 23 is triggered during gear shifting, it transmits the signal indicative of the calculated line pressure to the line pressure regulating means 19, thereby keeping the line pressure at the calculated level. The line pressure regulating means may be of the type which is disclosed in our copending U.S. Application Ser. No. 872,253, now U.S. Pat. No. 3,640,156 entitled "Control System for Automotive Automatic Transmission" and now allowed.

Figure 3:
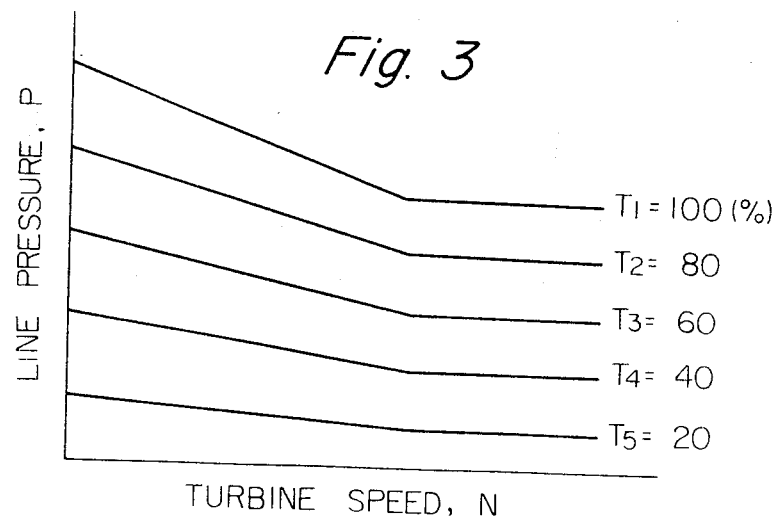
FIG. 3 is a plot of line pressure P against turbine speed N in which the curves represent various values of output torque T.

FIG. 3 shows a proper line pressure to be kept by the present line pressure control system 16 for the varying output torque T and turbine speed N. During the period when the line pressure command means 23 is not triggered, the line pressure regulating means 19 operates to keep the line pressure at a sufficiently high level.

Figure 4:
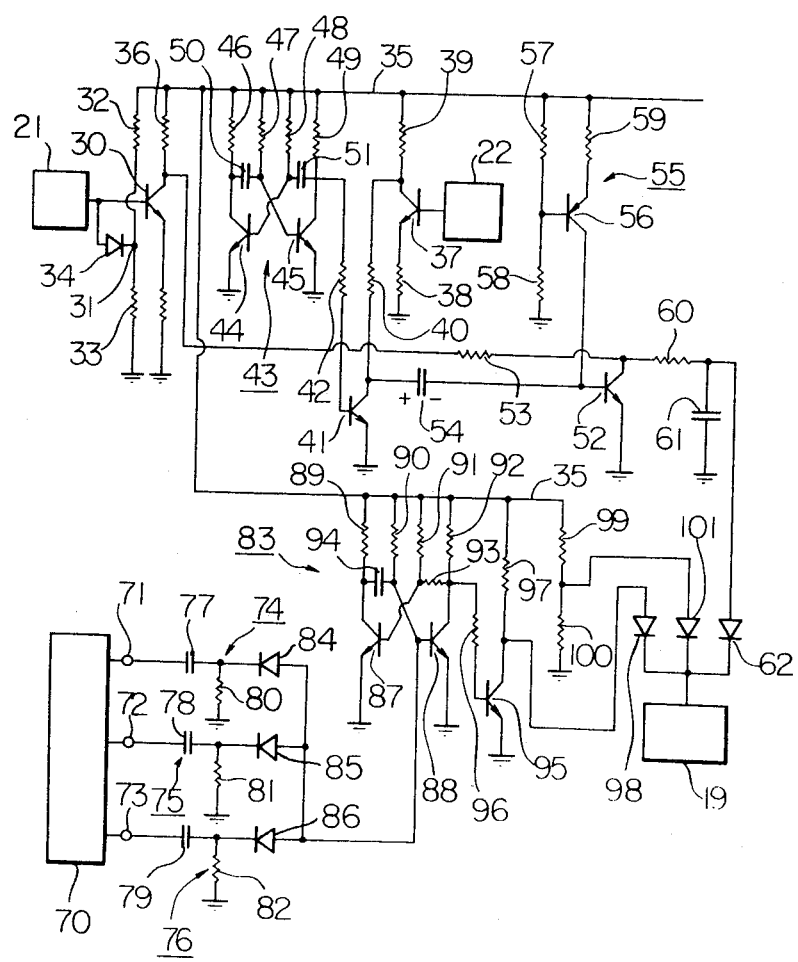
FIG. 4 is a circuit diagram of the line pressure control system shown in FIG. 2.
Figure 5A:
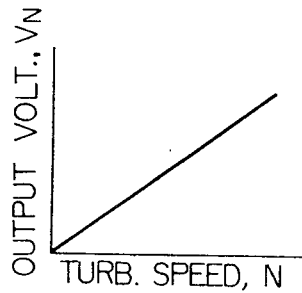
FIGS. 5a through 5h are plots which show voltage waveforms obtained at various points in the line pressure control system of FIG. 4.
Figure 5B:
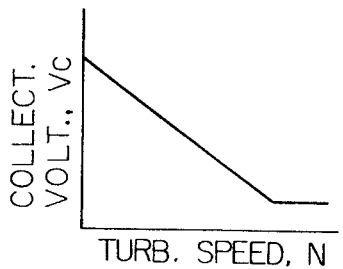

FIG. 4 shows a circuit diagram of the line pressure control system 16. The output of the turbine speed detecting means 21 is connected to the base of an NPN transistor 30 and to a point 31 between resistors 32 and 33 through a diode 34, the resistors 32 and 33 being serially connected between a bus line 35 and the ground. The emitter of the transistor 30 is grounded and the collector thereof is connected to the bus line 35 via a resistor 36. The diode 34 operates to clamp the output voltage of the turbine speed detecting means 21 at the voltage of the point 31 between the resistors 32 and 33. The output voltage $V_n$ of the turbine speed detecting means 21 is directly proportional to the turbine speed N, as seen in FIG. 5a. Thus, the voltage waveform appearing at the collector of the transistor 30 is, as shown in FIG. 5b, inversely proportional to the turbine speed N and is clamped at a low voltage level.

Figure 5C:
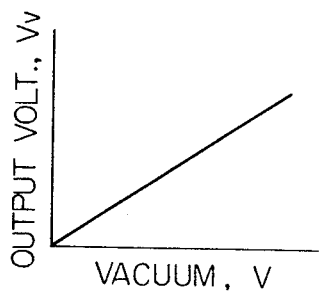
Figure 5D:
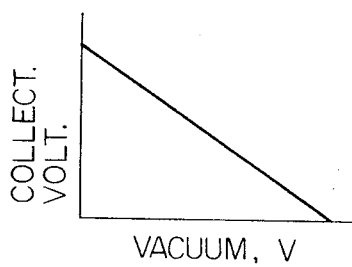

The output of the output torque detecting means 20 is connected to the base of an NPN transistor 37. The emitter of the transistor 37 is grounded via a resistor 38 and the collector thereof is connected to the bus line 35 through a resistor 39. The output $V_p$ of the output torque detecting means 20 is, as shown in FIG. 5c, directly proportional to the vacuum V in an intake manifold (which vacuum is proportional to the output torque T). Thus, the voltage appearing at the collector of the transistor 37 is proportional to the vacuum V, as shown in FIG. 5d. The collector of the transistor 37 is connected via a resistor 40 to the collector of an NPN transistor 41, and the emitter thereof is directly grounded.

Figure 5E:
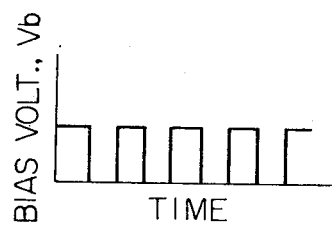
Figure 5F:
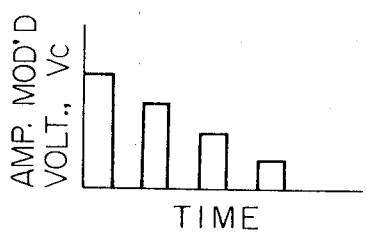

The base of the transistor 41 receives via a resistor 42 an output of an astable multivibrator, generally indicated at 43, comprising two NPN transistors 44 and 45, resistors 46, 47, 48 and 49 and capacitors 50 and 51. The output $V_b$ of the astable multivibrator 43 is a forward bias voltage to the transistor 41, the waveforms thereof being shown in FIG. 5e. Thus, the output $V_b$ of the astable multivibrator 43 is amplitude-modulated in accordance with the output of the transistor 37 by the transistor 41, the amplitude-modulated wave $V_c$ being shown in FIG. 5f.

Figure 5G:
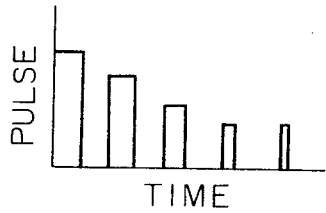

The collector of the transistor 30 is connected to the collector of an NPN transistor 52 by way of a resistor 53. The emitter of the transistor 52 is directly grounded and the base thereof is connected to the collector of the transistor 41 through a capacitor 54. The base of the transistor 52 is also connected to the bus line 35 through a constant current generating circuit 55 comprising an NPN transistor 56 and resistors 57, 58 and 59. When the transistor 41 is nonconducting, the capacitor 54 is charged by the collector voltage of the transistor 41 to have a polarity as shown, causing the charging current together with the constant bias current from the constant current source 55 to render the transistor 52 conducting. Subsequently, when the transistor 41 is rendered conducting, the capacitor 54 starts discharging and the discharging current from the capacitor 54 causes the transistor 52 to become nonconducting. When the capacitor 54 ceases to discharge, the constant current from the constant current source 55 flows into the base of the transistor 52, rendering it conducting. The duration in which the capacitor 54 is discharged increases with the amount of electric charge stored therein and accordingly with the voltage appearing at the collector of the transistor 41. As described above, the collector of the transistor 37, at which the voltage is inversely proportional to the vacuum V in the engine intake manifold, is connected to the collector of the transistor 41. It follows that the pulse appearing at the collector of the transistor 52 has a width inversely proportional to the vacuum V in the intake manifold. Furthermore, since, as described above, the collector of the transistor 52 is connected to the collector of the transistor 30 through the resistor 53, the height of the pulse at the collector of the transistor 52 is inversely proportional to the turbine speed N. The pulse appearing at the collector of the transistor 52 is clearly shown in FIG. 5g.

Figure 5H:
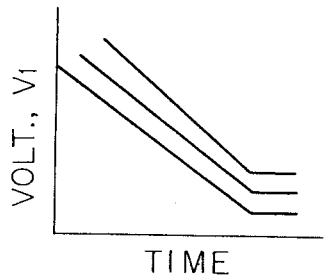

The collector of the transistor 52 is connected to a smoothing circuit comprising a resistor 60 and a capacitor 61. Thus, the voltage $V_1$ across the capacitor 61 is inversely proportional to the turbine speed N for various values of the vacuum in the intake manifold, as shown in FIG. 5h. The output of the smoothing circuit is applied to the line pressure regulating means 19 through a diode 62 thereby to have available a proper line pressure as shown in FIG. 3.

Shown in the lower lefthand portion of FIG. 4 is a gear shift indicating means 70 having three terminals 71, 72 and 73, at which the voltages drop when transitions to first, second and third speed ranges take place in the transmission, respectively. These terminals 71, 72 and 73 are connected to differentiating circuits 74, 75 and 76 having capacitors 77, 78 and 79 and resistors 80, 81 and 82, respectively. The gear shift indicating means is, for example, clearly disclosed as a manual selector switch 412 in U.S. Pat. No. 3,640,156 entitled "Control System for Automotive Automatic Transmission" and, therefore, the detail description of same is herein omitted. The outputs of these differentiating circuits 74, 75 and 76 are connected together through diodes 84, 85 and 86, respectively, to the base of a normally conducting transistor comprising monostable multivibrator 83. The monostable multivibrator 83 comprises NPN transistors 87 and 88, resistors 89, 90, 91, 92 and 93 and a capacitor 94. The output of the monostable multivibrator 83 is derived from the collector of the transistor 88 and is applied to the base of an NPN transistor 95 through a resistor 96. The emitter of the transistor 95 is grounded and the collector thereof connected to the bus line 35 via a resistor 97. The collector of the transistor 95 also is connected to the input of the line pressure regulating means 19 through a diode 98. The bus line 35 is connected to a voltage divider comprising resistors 99 and 100. The line connecting these resistors 99 and 100 is connected to the input of the line pressure regulating means 19 through a diode 101.

When transitions to first, second and third speed range take place in the transmission, a negative going pulse is formed by the differentiators 74, 75 and 76 to trigger the monostable multivibrator 83. When this occurs, the normally conducting transistor 88 is rendered non-conducting, causing the transistor 95 to become conducting. Therefore, the line pressure regulating means 19 receives no input voltage from the transistor 95 during the time period in which the monostable multivibrator 83 is kept in a metastable state, the time period being determined by the time constant of the circuit comprising the capacitor 94 and resistor 90. When the monostable multivibrator 83 returns to its stable state, then the transistor 88 is rendered conducting thereby to cause the transistor 95 to become nonconducting. As a consequence, the high voltage across the bus line 35 is applied to the input of the line pressure regulating means 19 through the resistor 97 and the diode 98. It is to be noted, in this instance, that the time period during which the monostable multi-vibrator 83 is in a metastable state should be equal to the time period required to control the line pressure.

When the monostable multivibrator 83 is in a metastable state, two input voltages are applied to the line pressure regulating means 19 through the diodes 62 and 101. The input voltage applied through the diode 101 serves to assure application of a minimum line pressure to the friction clutches and brakes of the transmission. Another input voltage from the smoothing circuit made up of the resistor 60 and capacitor 61 is related to the turbine speed N and the engine output torque T. Thus, when a proper line pressure assuring a smooth transition to take place in the transmission is applied to the friction clutches and brakes through the solenoid valves 17. Upon termination of this time interval, a high voltage is applied to the input of the line pressure regulating means 19 through the resistor 97 and the diode 98, thereby causing a high line pressure to be applied to the friction clutches and brakes.

What is claimed is:

1. A line pressure control system for controlling line pressure in an automatic transmission for a motor vehicle driven by an engine in which the automatic transmission includes a hydrodynamic torque converter having a turbine shaft, said line pressure control system comprising engine torque sensing means to sense an output torque of said engine and to generate a voltage proportional thereto; turbine speed sensing means to sense speed of said turbine shaft and to generate a voltage proportional thereto; first circuit means including clamping means connected to said turbine speed sensing means to clamp the voltage generated by said turbine speed sensing means at a given voltage level, charging means connected to said turbine speed sensing means through said clamping means to charge the voltage generated by said turbine speed sensing means, and electric means connected to said engine output torque sensing means to produce a pulse signal with a pulse width varying in dependent on the voltage generated by said engine output torque sensing means, said electric means being also connected to said charging means and periodically shutting off charging of said charging means for the duration of said pulse signal; sensing means to sense change of gear ratios and to generate a voltage signal indicative of one of said gear ratios; second circuit means including a monostable multivibrator connected to said sensing means to sense change of gear ratios, said monostable multivibrator generating a voltage signal with a constant duration upon receiving the voltage signal generated by said sensing means to sense change of gear ratios; and control means responsive to said voltage charged in said charging means of said first circuit means and to said voltage signal generated by said monostable multivibrator of said second circuit means to control the level of said line pressure.

2. A line pressure control system according to claim 1, wherein said control means includes a line pressure regulating means to regulate the line pressure level.

3. A line pressure control system according to claim 2, wherein said electric means of said first circuit means comprises an astable multivibrator, a first transistor connected at its base to the output of said engine torque sensing means and having its emitter grounded and collector connected through a resistor and a bus line to the input of said astable multivibrator, a second transistor connected at its collector through a resistor to the collector of the first transistor and at its base to the output of said astable multivibrator; a third transistor connected at its base to the collectors of said first and second transistors and at its collector to the output of said turbine speed sensing means through a resistor and having its emitter grounded, the collector of said third transistor being also connected through a smoothing circuit and a first diode to the input of said line pressure regulating means, a capacitor connected to the collectors of the first and second transistors and to the base of the third transistor, and a constant current generating circuit connected to the base of the third transistor, the arrangement being such that when the second transistor is cut off by said astable multivibrator, the capacitor is charged rendering the third transistor conductive, but the second transistor being rendered conductive, the capacitor discharges cutting off the third transistor for a preselected time period after which the constant current generating circuit renders the third transistor conducting whereby pulses appearing at the collector of the third transistor have a height proportional to engine torque and a width inversely proportional to turbine shaft speed.

* * * * *